United States Patent
Denney et al.

(10) Patent No.: US 7,006,535 B2
(45) Date of Patent: Feb. 28, 2006

(54) METHOD AND SYSTEM FOR PROVIDING TIME OFFSET TO MINISLOT CLOCK AND COUNT IN HEADEND DEVICES

(75) Inventors: Lisa V. Denney, Suwanee, GA (US); David R. Dworkin, Alpharetta, GA (US)

(73) Assignee: Broadcom Corporation, Irvine, CA (US)

(*) Notice: Subject to any disclaimer, the term of this patent is extended or adjusted under 35 U.S.C. 154(b) by 1058 days.

(21) Appl. No.: 09/933,764

(22) Filed: Aug. 22, 2001

(65) Prior Publication Data

US 2002/0093935 A1 Jul. 18, 2002

Related U.S. Application Data

(60) Provisional application No. 60/261,270, filed on Jan. 12, 2001.

(51) Int. Cl.
*H04J 3/16* (2006.01)
*H04J 3/06* (2006.01)

(52) U.S. Cl. .................. 370/508; 370/347; 370/519
(58) Field of Classification Search ............... 370/252, 370/347, 442, 507, 508, 519; 375/355, 358, 375/371
See application file for complete search history.

(56) References Cited

U.S. PATENT DOCUMENTS 4,694,453 A * 9/1987 Kobayashi et al. ......... 370/249
5,043,982 A 8/1991 Werner 5,317,571 A * 5/1994 Marcel et al. ............. 370/508
5,602,838 A * 2/1997 Kartalopoulos ........... 370/406

FOREIGN PATENT DOCUMENTS

EP 0 765 047 A1 3/1997
WO WO 00/28712 5/2000

OTHER PUBLICATIONS

Sater, G., "Media Access Control Protocol Based on DOCSIS 1.1," *IEEE 802.16mc-00/01:107-116, 168-173, and 195-196*, Retrieved from the Internet: <URL:http://grouper.ieee.org/groups/802/16/tgl/mac/contrib/802161mc-00_01.pdf> (Dec. 22, 1999).

* cited by examiner

Primary Examiner—Afsar Qureshi
(74) Attorney, Agent, or Firm—Sterne, Kessler, Goldstein & Fox, P.L.L.C.

(57) ABSTRACT

A method and system for allocating an initial maintenance request (IMR) for an upstream channel in a communications system, wherein the communication system includes a headend and at least one remote device associated with the channel. A first propagation delay from the headend to the remote device having the greatest delay is determined. Likewise, a second propagation delay from the headend to the remote device experiencing the least delay is determined. The IMR is then defined to be shorter than the first propagation delay and at least as long as the difference between the two propagation delays. The starting point of the IMR is established by modifying the clock output of the headend. A modification value is added to the headend clock output. The modification value corresponds to a time interval that can be as long as the propagation delay from the headend to the remote having the shortest delay.

14 Claims, 9 Drawing Sheets

METHOD AND SYSTEM FOR PROVIDING TIME OFFSET TO MINISLOT CLOCK AND COUNT IN HEADEND DEVICES

CROSS-REFERENCE TO RELATED APPLICATIONS

This application claims priority to U.S. Provisional Patent Application No. 60/261,270, filed Jan. 12, 2001, incorporated herein by reference in its entirety.

BACKGROUND OF THE INVENTION

1. Field of the Invention

The invention described herein relates to time division multiple access (TDMA) communications, and more particularly to synchronization between a headend and remote devices across a TDMA system.

2. Background Art

Certain communication systems include a set of remote communications devices connected to a headend device, such that the headend is responsible for distribution of information content to the remotes. In such a system, the headend may also have administrative functions, such as management of communications between the headend and the remotes. Transmissions from the headend to one or more remotes are denoted herein as downstream transmissions. Transmissions in the opposite direction, from a remote to its associated headend, are denoted herein as upstream transmissions. Because there can be several remotes associated with a single headend, upstream communications must be administered so as to maintain order and efficiency. An adequate level of service needs to be maintained. This can be done through the use of multiple channels in the upstream direction, and the use of time division multiple access (TDMA) communications in each channel of the upstream. In such an arrangement, the upstream bandwidth for each channel is controlled and allocated by the headend. Any given remote can transmit upstream only after requesting bandwidth and receiving a grant of the bandwidth from the headend.

One standard by which such a communications system can operate is the Data Over Cable System Interface Specification (DOCSIS). DOCSIS was originally conceived for cable communications systems. While DOCSIS can be applied to such communications systems, it is not necessarily limited to cable. Wireless communications systems, for example, can also operate under DOCSIS. Likewise, DOCSIS can be used in satellite communications systems.

In the realm of cable communications, DOCSIS specifies the requirements and objectives for a cable headend and for remote cable modems. A cable headend is also known as a cable modem termination system (CMTS). DOCSIS consists of a group of specifications that cover operations support systems, management, data interfaces, as well as network layer, data link layer, and physical layer transport. Note that DOCSIS does not specify an application layer. The DOCSIS specification includes extensive media access layer (MAC) and physical (PHY) layer upstream parameter control for robustness and adaptability. DOCSIS also provides link layer security with authentication. This prevents theft of service and provides some assurance of traffic integrity.

The current version of DOCSIS (DOCSIS 1.1) uses a request/grant mechanism for allowing remote devices (such as cable modems) to access upstream bandwidth. DOCSIS 1.1 also allows the provision of different services to different parties who may be tied to a single modem. With respect to the processing of packets, DOCSIS 1.1 allows segmentation of large packets which simplifies bandwidth allocation. DOCSIS 1.1 also allows for the combining of multiple small packets to increase throughput as necessary. Security features are present through the specification of 56-bit data encryption standard (DES), encryption and decryption to secure the privacy of a connection. DOCSIS 1.1 also provides for payload header suppression, whereby unnecessary ethernet/IP header information can be suppressed for improved bandwidth utilization. DOCSIS 1.1 also supports dynamic channel change. The downstream channel or the upstream channel or both can be changed on the fly. This allows for load balancing of channels and can improve robustness.

In communications systems such as this, propagation delay can be an operational concern and must be accommodated. Any transmission, upstream or downstream, between a headend and a remote device will require some amount of time to reach its destination. Moreover, given a headend and several associated remotes, the upstream propagation delay between each of the remotes and the headend may be different. Efficient upstream communication, however, requires synchronization between a headend and each of its remotes. Contention is minimized and processing is made more efficient if, for example, a headend knows when to expect a transmission from a remote. This is possible only when the headend and each remote have the same sense of time.

DOCSIS provides a solution to the upstream synchronization problem. The headend sends out a synchronization message to all remote devices associated with the headend. The synchronization message contains a 32-bit time stamp, based on 10.24 megahertz (MHz) clock. The time stamp is a statement of the value of the headend's clock at the time of transmission of the synchronization message. The time stamp is used to achieve synchronicity with respect to the upstream communications, by providing each remote with the clock value of the headend, current as of the time of transmission of the synchronization message. Each remote device then locks the frequency and phase of its local clock counter to match the count contained in the received time stamp.

Note that the 10.24 MHz clock can, in some systems, be interpreted in terms of time units, or "ticks." Each tick can, for example, be 6.25 microseconds. Ticks can be further organized into larger units called minislots. The number of ticks per minislot can be defined at the discretion of the headend. The available upstream bandwidth can therefore be viewed as a series of minislots.

After receiving the time stamp, each remote then adjusts its local clock to compensate for some of the propagation delay between it and the headend. This compensation step takes into account the known factors that contribute to overall propagation delay. Such factors include system topology and downstream interleaving. This compensation is known as ranging offset. Each remote adds the ranging offset to its local 32-bit clock The resulting clock value is then arithmetically converted into a minislot count.

After the synchronization message, the headend sends an initial map message (commonly denoted in its capitalized form, "MAP message" and used hereinafter in this form) to all its remote devices operating on a given channel. This message, in general, tells each remote what minislot(s) the remote can use for transmission in the upstream. This message therefore maps remotes to minislots. This message also defines a specific point in the upstream (e.g., a specific minislot) at which remotes are to respond. When a remote's response is received at the headend, the headend compares the actual arrival time in the upstream with the expected arrival time. Any difference between these two points represents additional (as yet unaccounted for) propagation delay with respect to the responding remote. The headend can then inform the remote of this difference, allowing the remote to further adjust its local clock. As a result of this adjustment, the headend and the remote will have the same sense of time with respect to upstream communications.

In particular, the initial MAP message defines, in the upstream, a starting point (a minislot) in an initial maintenance region (IMR). The IMR represents an interval in the upstream during which any of the associated remotes operating on the given channel can respond to the headend. The MAP message therefore allocates upstream bandwidth. Because the MAP message defines the initial point in time (minislot) in the upstream at which a remote can respond, each remote will respond when its minislot count corresponds to the minislot identified in the MAP message. The headend will then expect a response at that point in time in the upstream.

However, there will typically be some residual propagation delay. The headend will expect a response at a certain point in time in the upstream; the remote will transmit a response at what it believes to be that point in time in the upstream. When the transmission arrives at the headend, it will typically be somewhat later than expected by the headend. This delay represents residual propagation delay of the responding remote. The headend will then tell the remote the size of this residual propagation delay. This allows the remote to further adjust its internal time stamp (TS) counter by this amount. At this point, the remote is effectively synchronized with the headend. A subsequent message sent by the remote at a specific point in time in the upstream will therefore be received at the headend at what the headend understands to be that point in time in the upstream.

Note that the IMR, as allocated by the headend, must be sufficiently large to accommodate any possible propagation delay. As a result, the IMR might represent a significant amount of time (i.e., bandwidth) in the upstream. The IMR must accommodate all of the possible propagation delays for the set of remotes associated with a headend with respect to a particular upstream channel. In some communications systems, however, upstream bandwidth is valuable. It represents opportunities for remotes to transmit information back to the headend. Such transmissions can represent sources of revenue for a communications system provider. Therefore, dedicating a substantial IMR for purposes of achieving synchronization throughout the system represents an inefficiency and a possible loss of revenue to the system provider. Therefore, there is a need for a synchronization process that requires less of the upstream bandwidth for an IMR.

BRIEF SUMMARY OF THE INVENTION

The present invention is a method and system for allocating an initial maintenance request (IMR) for an upstream channel in a communications system, wherein the communication system includes a headend and at least one remote device associated with the channel. A first propagation delay from the headend to the remote device having the greatest delay is determined. Likewise, a second propagation delay from the headend to the remote device experiencing the least delay is determined. The IMR is then defined to be shorter than the first propagation delay and at least as long as the difference between the two propagation delays. The starting point of the IMR is established by modifying the TS counter output of the headend. A modification value is added to the headend TS counter output. The modification value corresponds to a time interval that can be as long as the propagation delay from the headend to the remote having the shortest delay.

The invention described herein has the feature of calculating the difference between the first and second propagation delays. The invention has the additional feature of determining the start of an IMR so as to take into account the propagation between the headend and the remote having the shortest propagation delay. The invention has the advantage of allowing IMRs that require a minimum of upstream bandwidth.

The foregoing and other features and advantages of the invention will be apparent from the following, more particular description of a preferred embodiment of the invention, as illustrated in the accompanying drawings.

DETAILED DESCRIPTION OF THE INVENTION

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

Figure 1:
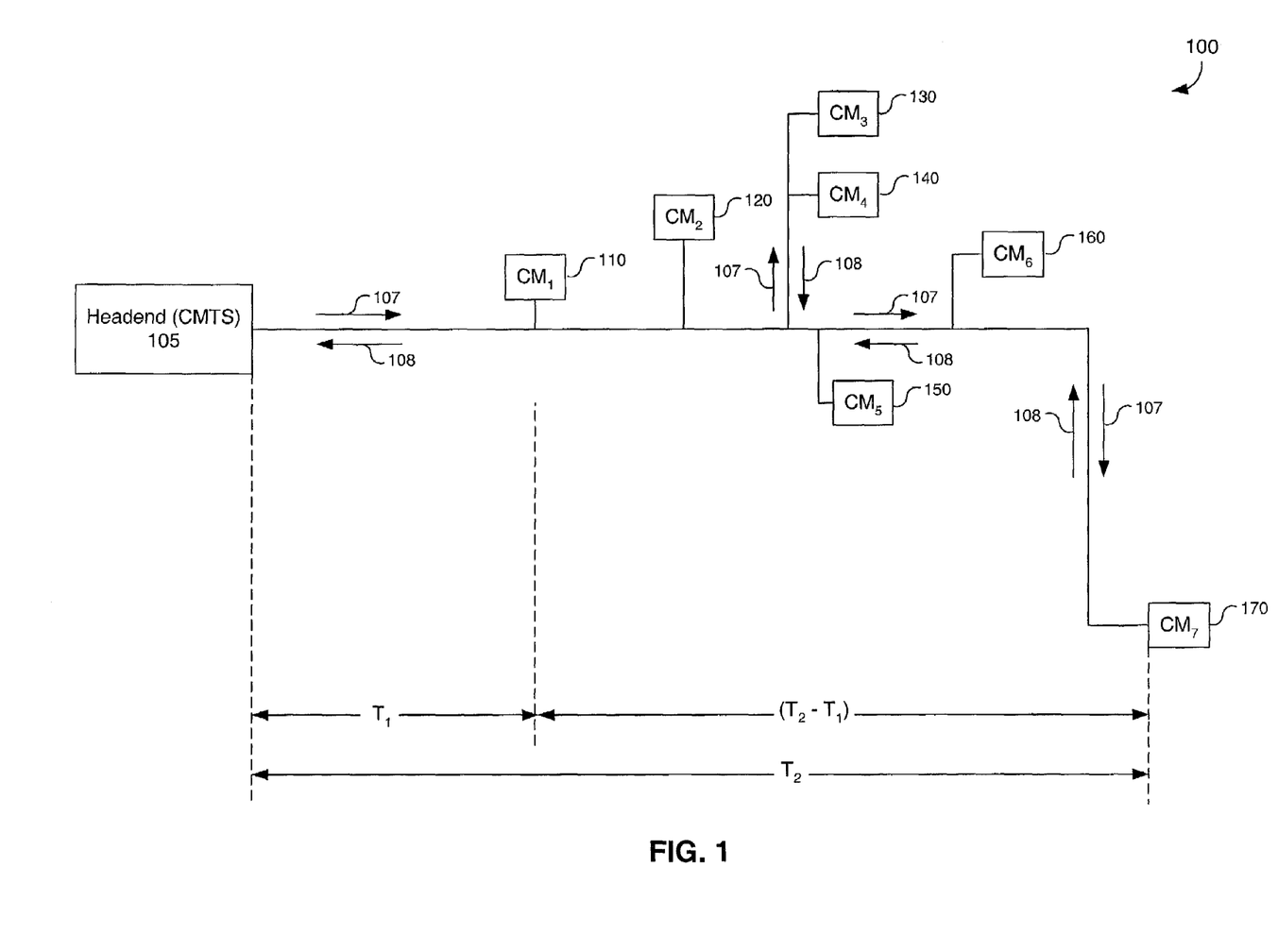
FIG. 1 illustrates an example topology of a communications system featuring a headend and a set of remote cable modems.

The invention described herein addresses the problem of how to conserve upstream bandwidth in a DOCSIS-based communications system, or similar system. An example of such a system is illustrated in FIG. 1. System 100 includes a headend 105. Headend 105 may, for example, be a cable modem termination system (CMTS). One such CMTS is the BCM93212, available from BROADCOM Corporation, of Irvine, Calif. Downstream transmissions travel in direction 107; upstream transmissions travel in direction 108. Units 110 through 170 represent remote devices. In a cable communications system, each remote is a cable modem (CM). Note that the route of communications between each cable modem and the headend 105 is slightly different. For this and other reasons, the propagation delays between headend 105 and each cable modem, respectively, can be different. The propagation delay between headend 105 and remote 110 ($CM_1$) is shown as $T_1$. In contrast, the propagation delay between headend 105 and remote 170 ($CM_7$) is shown as $T_2$. In the conventional DOCSIS synchronization process, the IMR is defined to accommodate the propagation delay between headend 105 and the remote having the greatest propagation delay (here, remote 170). Recall that the IMR represents an interval in the upstream during which any of the associated remotes operating on the given channel can respond to the headend. The present invention shortens the IMR so that it only needs to accommodate the difference between the shortest and longest propagation delays, $T_2-T_1$. The resulting shorter IMR consumes less upstream bandwidth and therefore represents a more efficient way to synchronize a headend with its associated remote devices.

II. Apparatus

Definition of an IMR relies on the clock output at the headend. In an embodiment of the invention, a hardware implementation is used to create a 32-bit clock output, i.e., a counter, for an upstream channel. Such counters are known to persons of ordinary skill in the art.

Figure 2:
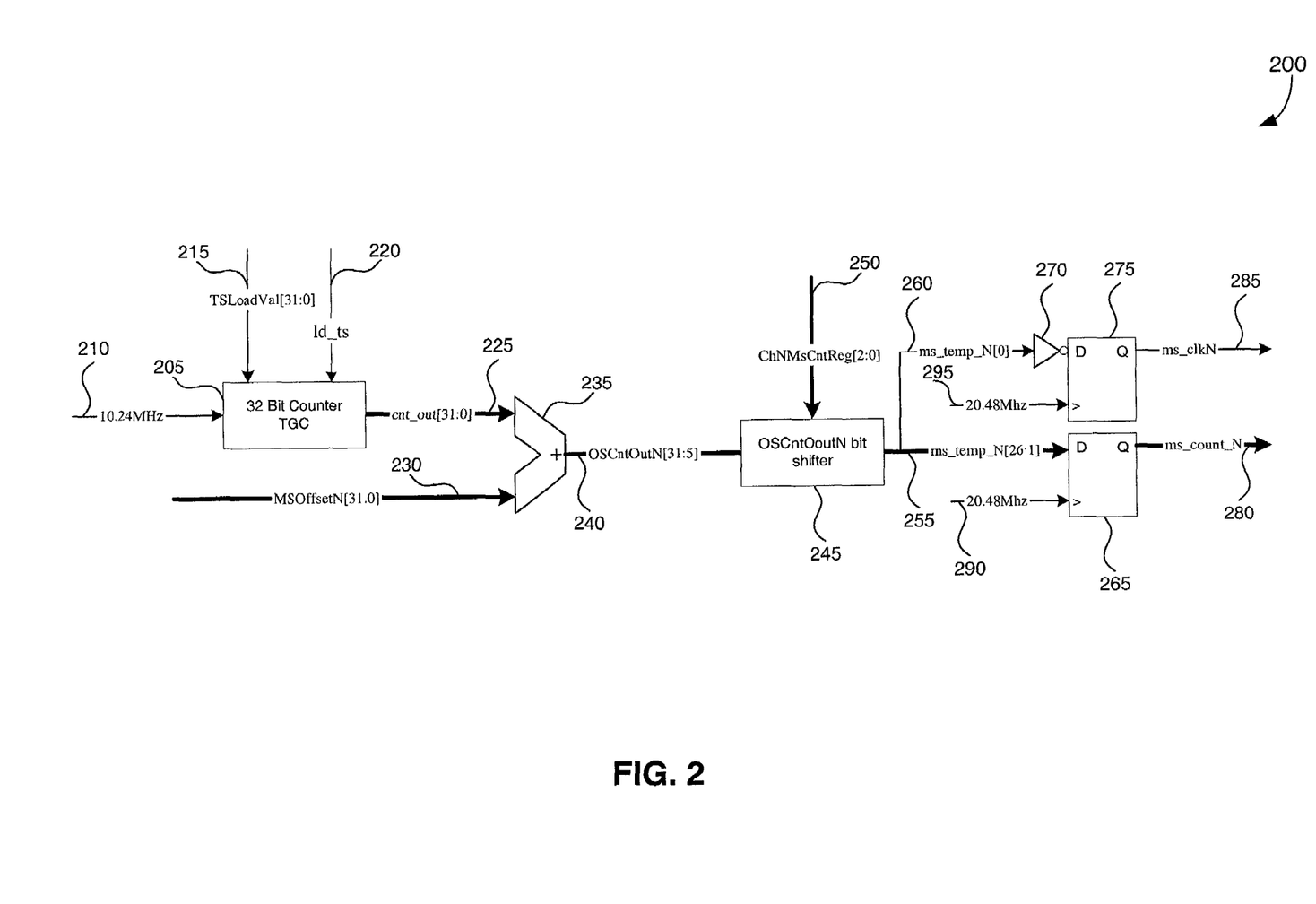
FIG. 2 illustrates a circuit that modifies a CMTS time base reference so as to alter the start point of an IMR, according to an embodiment of the invention.

FIG. 2 illustrates a hardware embodiment of the invention wherein the clock output for an upstream channel is modified by an offset. A 32-bit counter 205 is clocked by a signal 210. In the embodiment shown in FIG. 2, clock signal 210 has a frequency of 10.24 MHz. Counter 205 receives a time stamp load value 215 and is controlled by a load time stamp signal 220. Time stamp load value 215 replaces any existing counter value if signal 220 so enables. Counter 205 produces counter output 225. Counter output 225, along with an offset value 230, are combined in adder 235, thereby modifying counter output 225. The offset 230, in an embodiment of the invention, corresponds to the propagation delay between the remote unit having the shortest propagation delay and the headend. In an embodiment of the invention, offset 230 is expressed in 98 nanosecond increments. As described above, a clock signal can, in some systems, be interpreted in terms of time units, or "ticks." Ticks can be further organized into larger units called minislots. The number of ticks per minislot can be defined at the discretion of the headend. The available upstream bandwidth can therefore be viewed as a series of minislots.

The output of adder 235 is offset counter output 240. In the embodiment shown, output 240 enters bit shifter 245 and is right-shifted. The shifting process is controlled by minislot count regulator signal 250. Each shift of one position, i.e., division by two, doubles the minislot size (number of ticks per minislot). Hence the size of minislots can be controlled.

The output of shifter 245 is divided into two signals, 260 (bit 0) and 255 (the remaining 26 bits). Signal 260 is passed through inverter 270 and sent to flip flop 275. The output of flip flop 275 is minislot clock 285. The 26 bits of signal 255 are sent to 26 corresponding flip flops, shown collectively as flip flop 265. The output of flip flop 265 is minislot count 280. In the embodiment illustrated, flip flops 265 and 275 are each driven by 20.48 MHz clocks 290 and 295, respectively. Also, in an embodiment of the invention, adder 235 is programmable, so that offset 230 can have different values as necessary.

This modification to counter output 225 serves to define the beginning of the IMR. Offsetting the output 225 serves to offset the value representing the point in the upstream at which any remote can respond. This value, now offset, is used in the MAP message. This delays the point in the upstream at which the remote can respond, and the allocated IMR is effectively shorter than it would otherwise be. Hence less upstream bandwidth is needed for the IMR.

III. Method

Figure 3A:
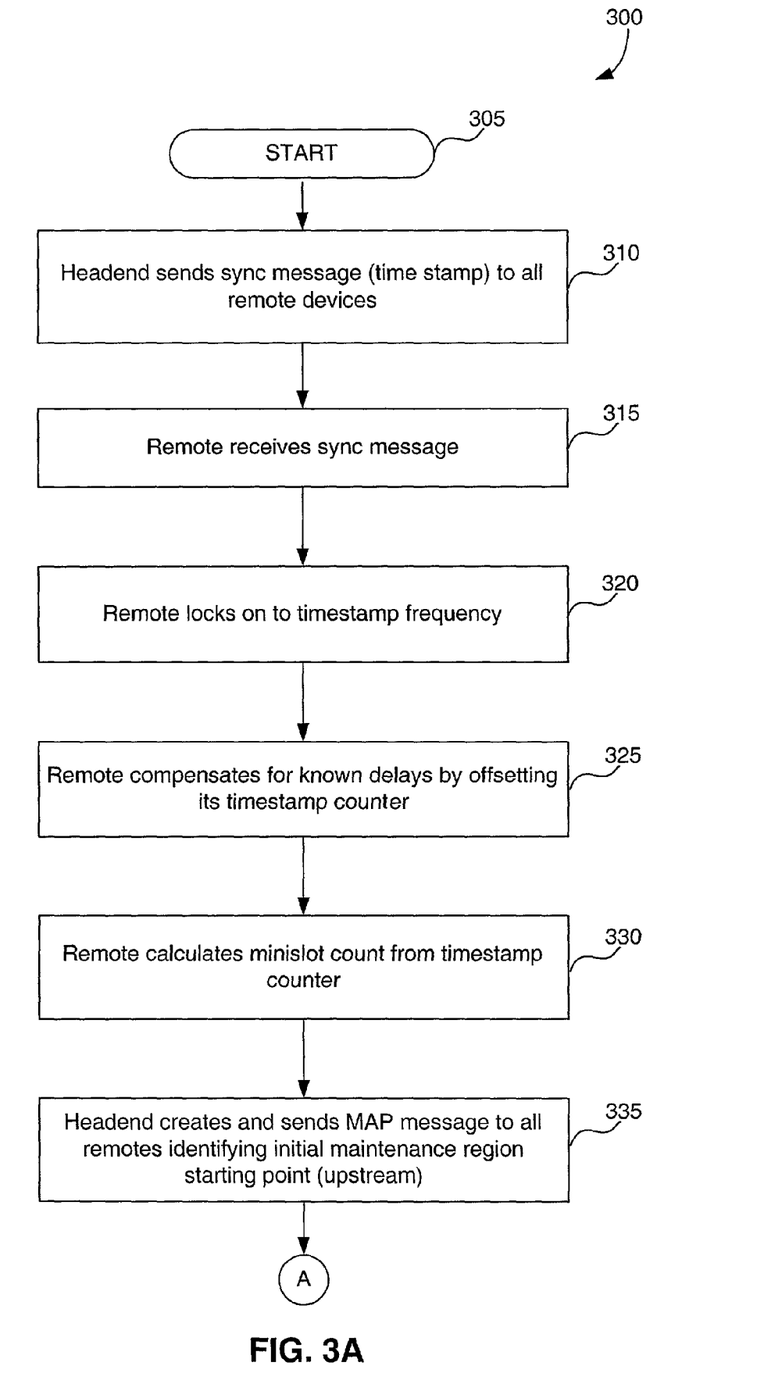
FIGS. 3A and 3B illustrate the synchronization process between a headend and a set of remote devices, according to DOCSIS.
Figure 3B:
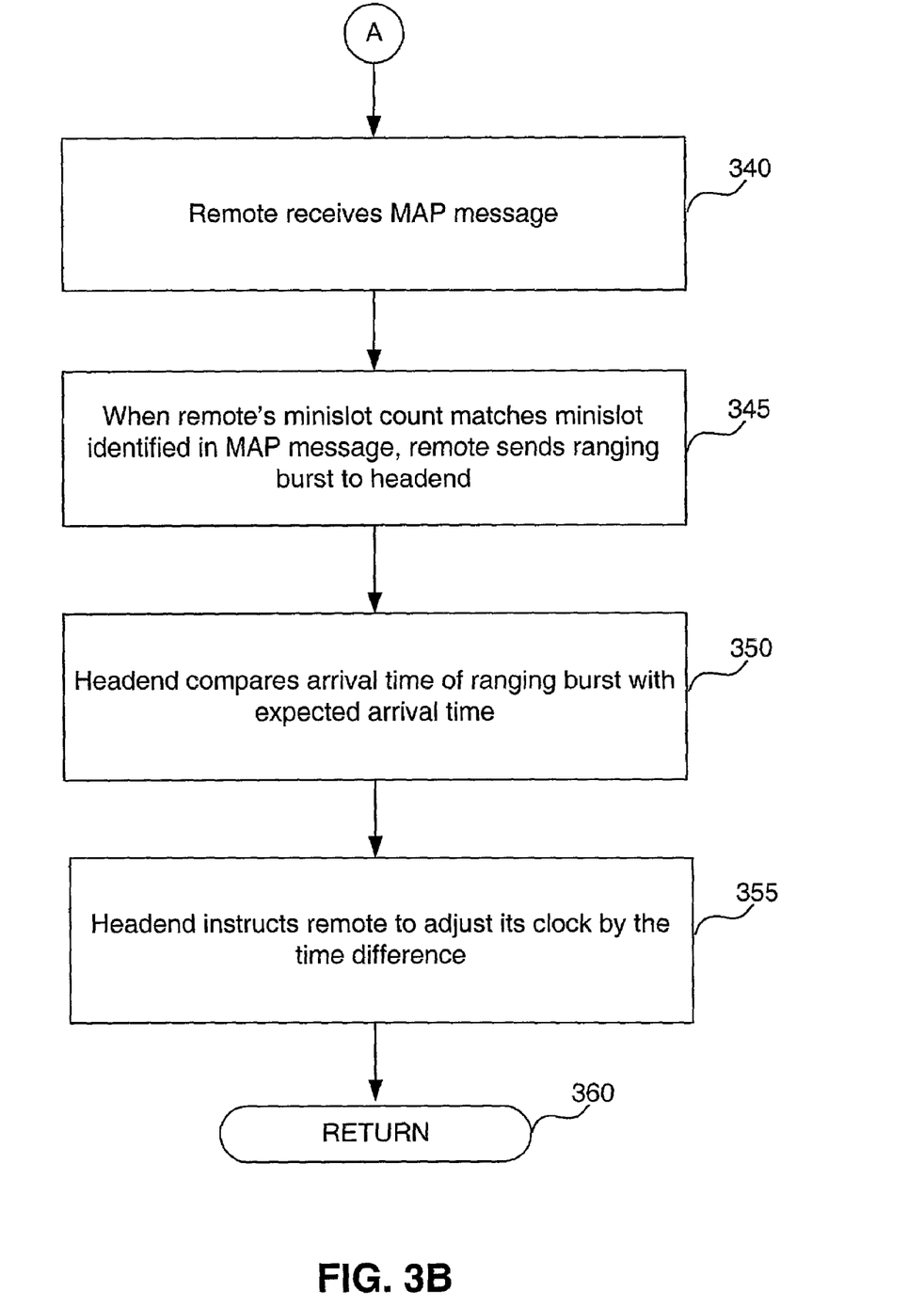

As described above, the invention described herein provides for the creation of an IMR that conserves upstream bandwidth during the synchronization process. The overall synchronization process is illustrated in FIGS. 3A and 3B. The process begins with step 305. In step 310, the headend sends a synchronization message to all of its associated remote devices that will be operating on a given upstream channel. As discussed above, the synchronization message contains a time stamp that represents the current clock value at the headend. In step 315, each such remote receives the synchronization message. In step 320, each remote locks on to the frequency of the headend clock, conveyed in the synchronization message. In step 325, the remote compensates for any known delays by adjusting its local clock. In step 330, each remote device calculates a current local minislot count based on its local clock value.

In step 335, the headend sends a MAP message to all associated remotes, identifying the starting point, in the upstream, of an IMR. The starting point can be identified in terms of a specific minislot. In step 340, each remote receives the MAP message. In step 345, when a remote's minislot count matches the minislot identified in the MAP message, the remote sends a burst transmission to the headend in response. A burst used in this context, for establishing synchronization, is known as a ranging burst. In step 350, a burst demodulator in the headend compares the arrival time of the ranging burst with the expected arrival time of the burst. In step 355, the headend instructs the remote to adjust its (the remote's) local clock by the time difference. Once the remote does so, the synchronization process concludes at step 360.

Note that DOCSIS also provides a procedure wherein contention by remotes for an IMR is resolved. This involves the selection, by a remote, of a random value between one and a specified initial backoff value. The remote then sends a ranging burst in an IMR that corresponds to this random value. If the ranging burst is not heard at the headend, another random value is selected by the remote, between one and a new backoff value. This process is described in detail in the DOCSIS 1.1 specification, incorporated herein by reference in its entirety.

Figure 4:
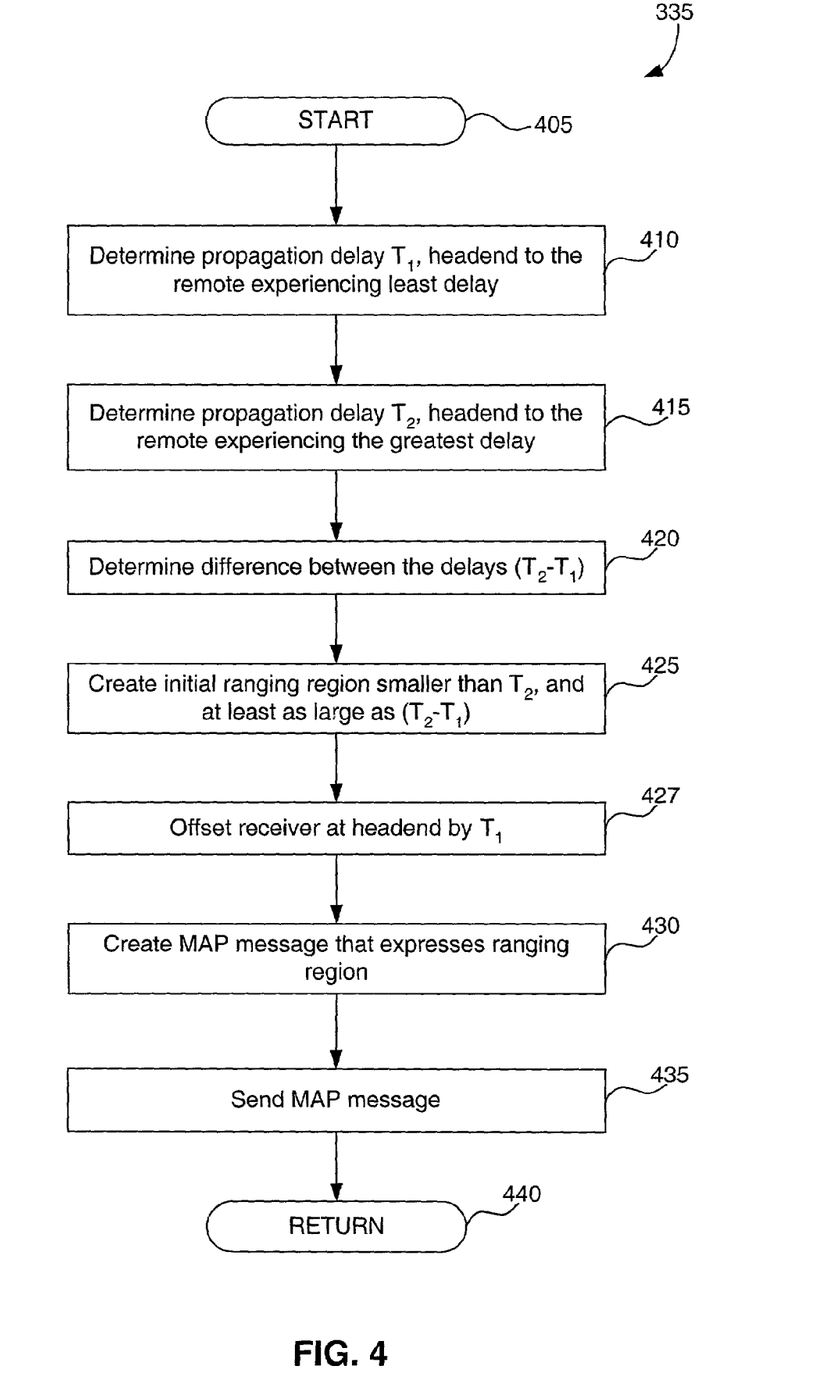
FIG. 4 is a flowchart illustrating the process of defining an IMR that reserves less bandwidth in the upstream, and the creation of a MAP message that conveys the IMR to remote devices, according to an embodiment of the invention.

The step of creating and sending a MAP message that contains the IMR starting point, step 335, is illustrated in greater detail in FIG. 4. The process begins at step 405. In step 410, the propagation delay $T_1$ between the remote device experiencing the least propagation delay and the headend's burst demodulator is determined. In step 415, the propagation delay $T_2$ between the remote that experiences the greatest propagation delay and the headend's burst demodulator is determined. The determination of $T_1$ and $T_2$ can be accomplished in several ways. For example, linear distance can be measured, which can them divided by the speed of light in the case of a fiber optic transmission medium. Alternatively, delays can be measured directly by conducting empirical tests.

In step 420, the difference between the two delays $(T_2-T_1)$ is determined. In step 425, an IMR is allocated, smaller than $T_2$ and at least as large as the difference $(T_2-T_1)$. In an embodiment of the invention, the IMR is $(T_2-T_1)$ in length. In the case where the IMR is $(T_2-T_1)$ in length, the IMR starting point, as indicated in the MAP message, will be the current clock output plus $T_1$. Accordingly, in step 427 the notion of time at the headend receiver is offset by $T_1$. In step 430, a MAP message is created that expresses the starting point of this IMR. In step 435, this MAP message is sent to the remote devices. The process concludes at step 440.

In some contexts, synchronization may be performed on a periodic basis in order to maintain synchronicity between the headend and its remotes. At other times, system maintenance, disruption of operations, or other external events could necessitate resynchronization. The process of FIG. 4, however, is not necessarily repeated. The values $T_1$, $T_2$, and $T_2-T_1$ should not change, so that in an embodiment of the invention, this difference only needs to be determined once, and the offset of the headend is performed once.

IV. Alternative Topology

Figure 5:
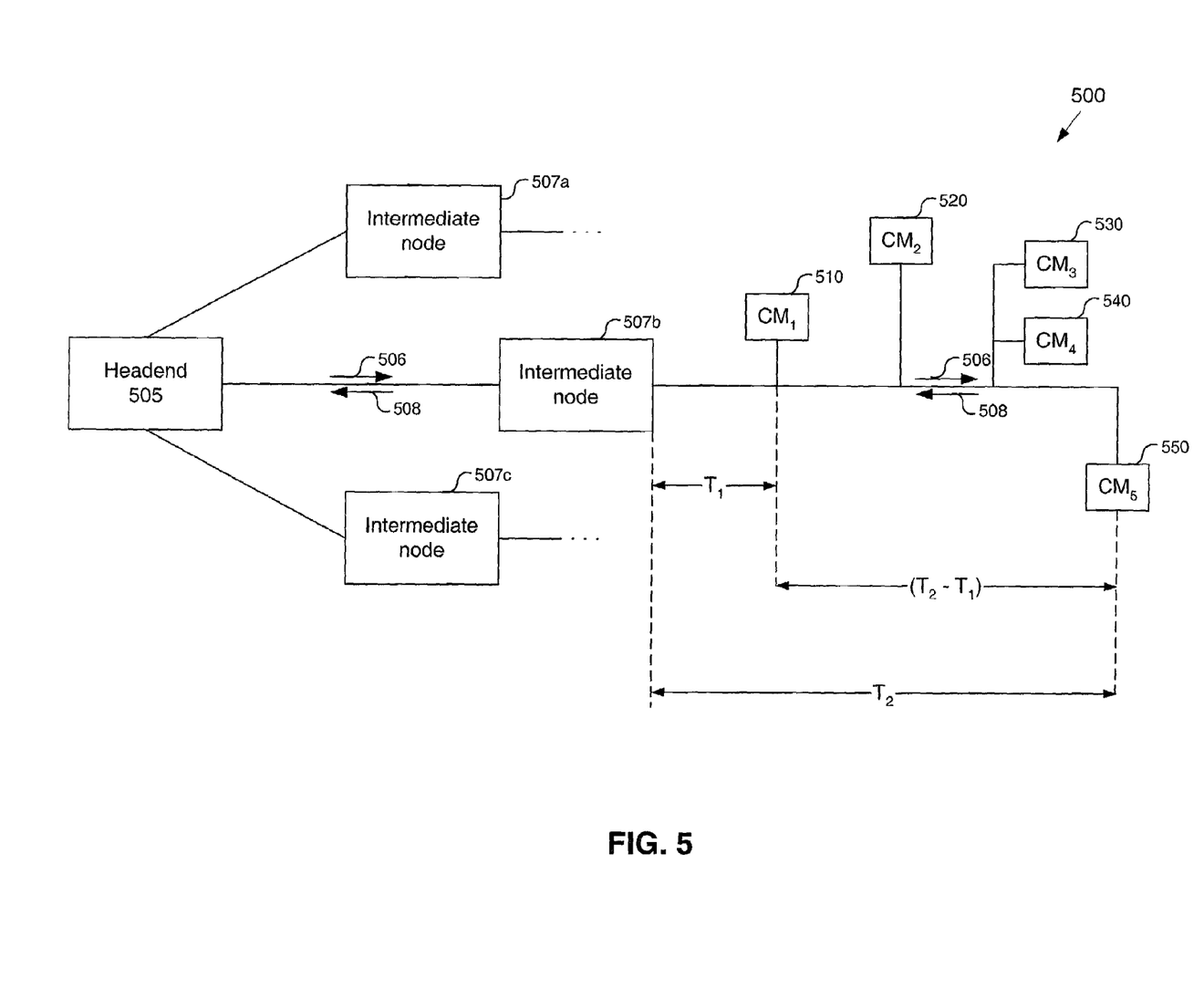
FIG. 5 illustrates an example topology of a communications system featuring a headend, an intermediate node, and a set of remote cable modems.

Other system topologies are possible, in addition to that of FIG. 1. One such alternative topology is shown in FIG. 5. Downstream transmissions travel from a headend 505 in direction 506; upstream transmissions travel in direction 508. In this system, unlike that of FIG. 1, some of the functionality that would otherwise reside in a conventional CMTS (such as headend 105 of FIG. 1), is allocated to intermediate nodes. These intermediate nodes are illustrated in FIG. 5 as nodes 507a through 507c. Physical layer processing, for example, can be handled in an intermediate node. This can include demodulation of upstream transmissions. In a burst communications system, therefore, an intermediate node can include one or more burst demodulators in addition to a burst receiver.

Units 510 through 550 represent remote devices. In a cable communications system, each remote is a cable modem (CM). The route of communications between each cable modem and intermediate node 507b is slightly different, so that the propagation delays between each cable modem, respectively, and intermediate node 507b and can be different. The propagation delay between remote 510 ($CM_1$) and intermediate node 507b is shown as $T_1$. In contrast, the propagation delay between remote 550 ($CM_5$) and intermediate node 507b is $T_2$.

In this topology, the IMR is defined to accommodate the propagation delay between the remote having the greatest propagation delay (here, remote 550) and intermediate node 507b. The IMR represents an interval in the upstream during which any of the associated remotes operating on the given channel can respond to the headend. As in the topology of FIG. 1, the present invention shortens the IMR so that it only needs to accommodate the difference between the shortest and longest propagation delays, $T_2-T_1$. The resulting shorter IMR consumes less upstream bandwidth and therefore represents a more efficient way to synchronize a headend and intermediate node with associated remote devices.

As described above, the invention described herein provides for the creation of an IMR that conserves upstream bandwidth during the synchronization process. The overall synchronization process is illustrated in in FIGS. 6A and 6B. The process begins with step 605. In step 610, the headend sends a synchronization message to all of its associated remote devices that will be operating on a given upstream channel. As discussed above, the synchronization message contains a time stamp that represents the current clock value at the headend. In step 615, each such remote receives the synchronization message. In step 620, each remote locks on to the frequency of the headend clock, conveyed in the synchronization message. In step 625, each remote compensates for any known delays by adjusting its local clock. In step 630, each remote device calculates a current local minislot count based on its local clock value.

Figure 6A:
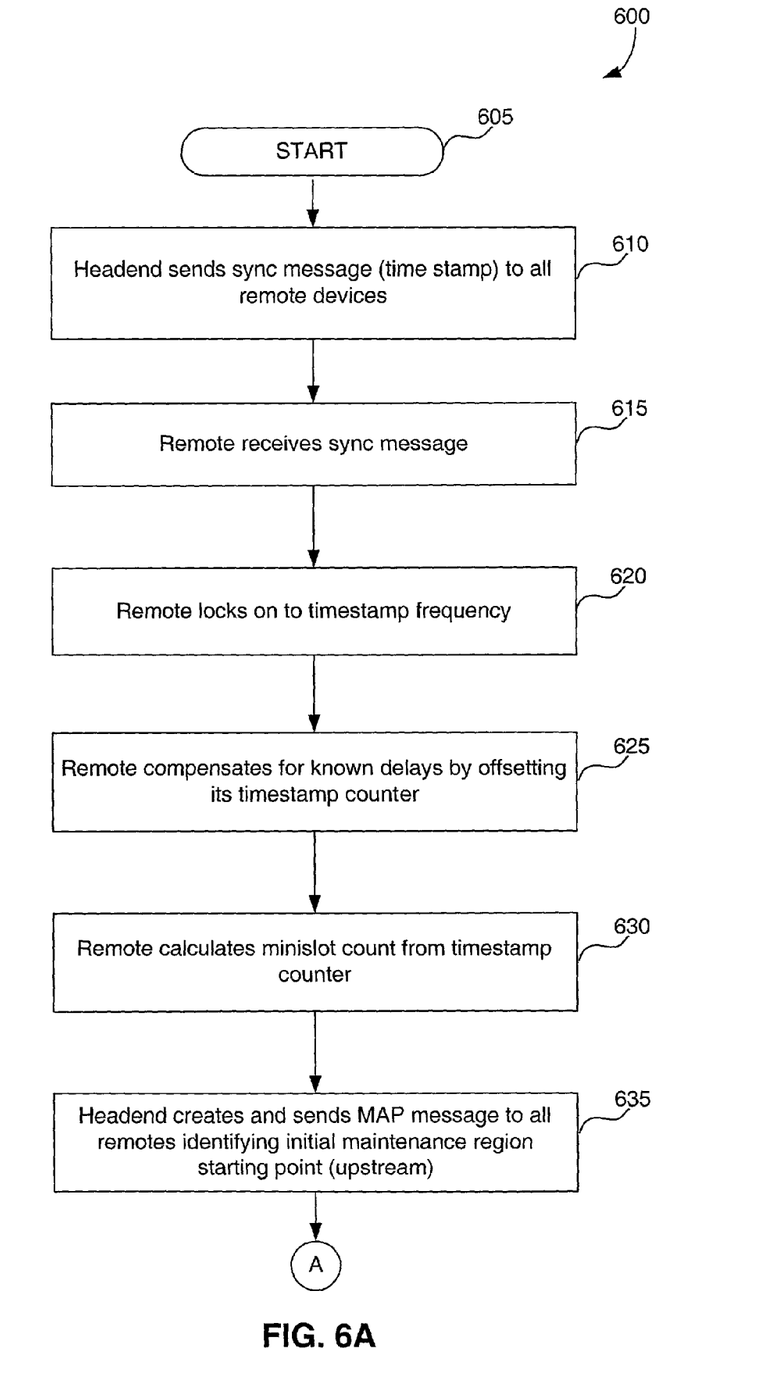
FIGS. 6A and 6B illustrate the synchronization process between a headend and a set of remote devices, given a topology that includes an intermediate node.
Figure 6B:
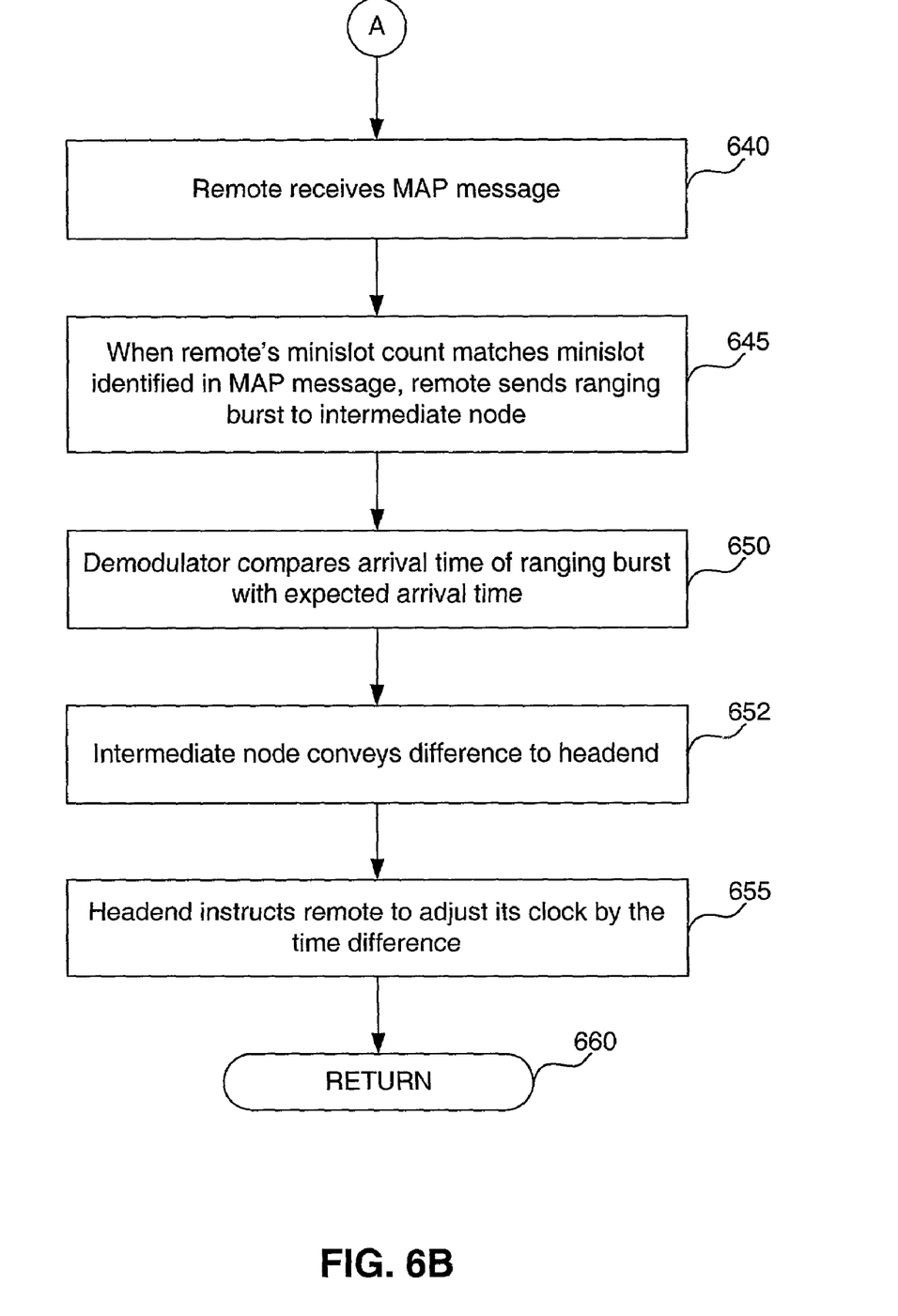

In step 635, the headend sends a MAP message to all associated remotes on a given upstream channel, identifying the starting point, in the upstream, of an IMR. The starting point can be identified in terms of a specific minislot. In step each remote receives the MAP message, as does the intermediate node. In step 645, when a remote's minislot count matches the minislot identified in the MAP message, the remote sends a ranging burst to the intermediate node in response. In step 650, a burst demodulator in the intermediate node compares the arrival time of the ranging burst with the expected arrival time of the burst. In step 652, the difference between the arrival time and the expected arrival time is conveyed to the headend. In step 655, the headend instructs the remote to adjust its (the remote's) local clock by the time difference. Once the remote does so, the synchronization process concludes at step 660.

Figure 7:
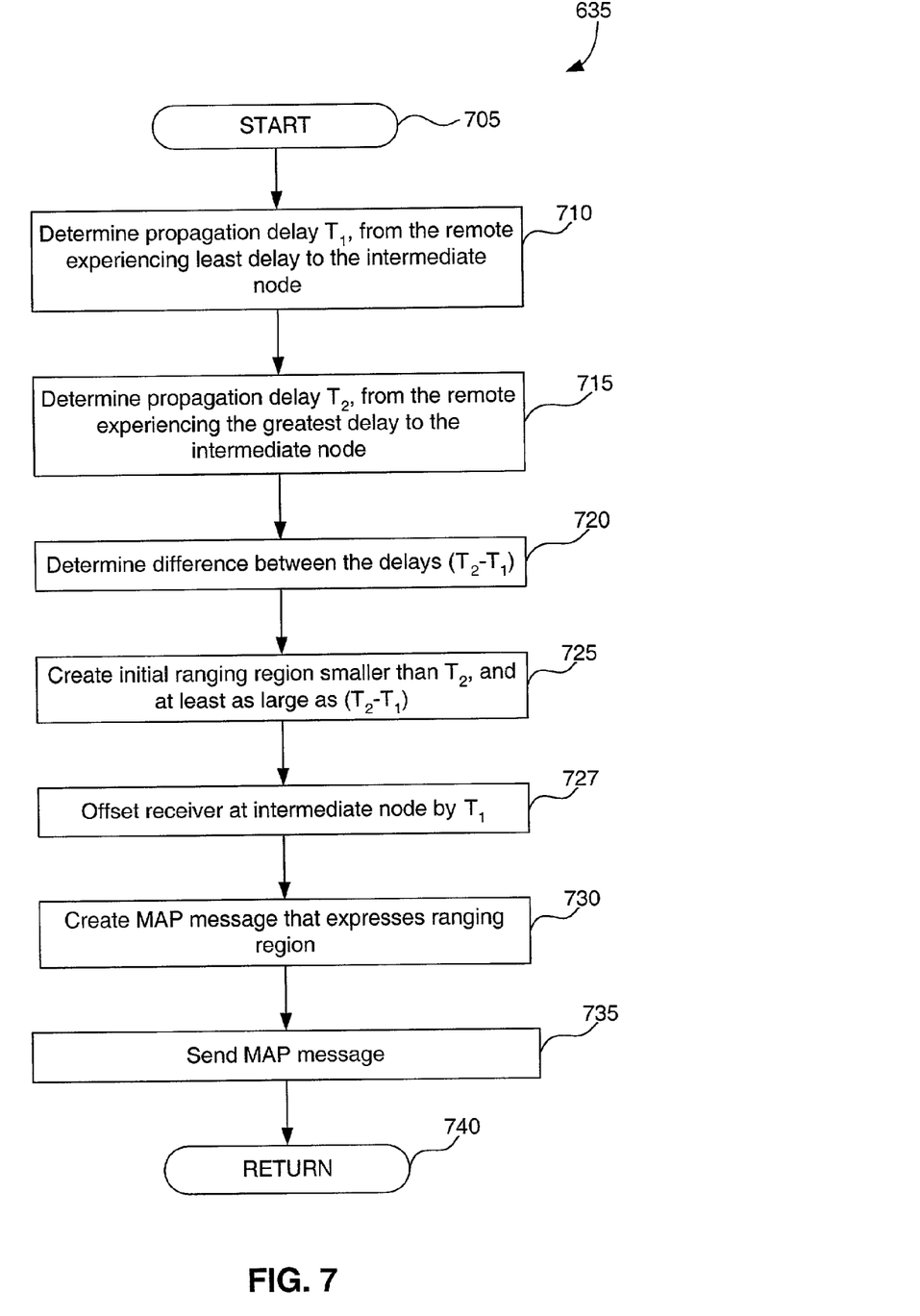
FIG. 7 is a flowchart illustrating the process of defining an IMR that reserves less bandwidth in the upstream and the creation of a MAP message that conveys the IMR to remote devices, given a topology that includes an intermediate node, according to an embodiment of the invention.

The step of creating and sending a MAP message that contains the IMR starting point, step 635, is illustrated in greater detail in FIG. 7. The process begins at step 705. In step 710, the propagation delay between the remote device experiencing the least propagation delay (CM 510 in FIG. 5) and the intermediate node is determined. This delay is denoted $T_1$ in FIG. 5. In step 715, the propagation delay between the remote that experiences the greatest propagation delay (CM 550 in FIG. 5) and the intermediate node is determined ($T_2$). The determination of $T_1$ and $T_2$ can be accomplished in several ways. For example, linear distance can be measured, which can them divided by the speed of light in the case of a fiber optic transmission medium. Alternatively, delays can be measured directly by conducting empirical tests.

In step 720, the difference between the two delays $(T_2-T_1)$ is determined. In step 725, an IMR is allocated by the headend, smaller than $T_2$ and at least as large as the difference $T_2-T_1$. In an embodiment of the invention, the IMR is $(T_2-T_1)$ in length. In the case where the IMR is $(T_2-T_1)$ in length, the IMR starting point, as indicated in the MAP message, will be the current clock output plus $T_1$. Accordingly, in step 727 the notion of time at the intermediate node's receiver is offset by $T_1$. In step 730, a MAP message is created that expresses the starting point of this IMR. In step 735, this MAP message is sent by the headend to the remote devices. The process concludes at step 740.

In some contexts, synchronization may be performed on a periodic basis in order to maintain synchronicity between the headend and its remotes. At other times, system maintenance, disruption of operations, or other external events could necessitate resynchronization. The process of FIG. 7, however, is not necessarily repeated. The values $T_1$, $T_2$, and $T_2-T_1$ should not change, so that in an embodiment of the invention, this difference only needs to be determined once, and the offset of the intermediate node's receiver is performed once.

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A method of allocating an initial maintenance region for an upstream channel in a communications system, wherein the communications system comprises a headend and at least one remote device associated with the channel, said method comprising the steps of:
   a. determining a propagation delay $T_2$ from a remote device experiencing the greatest delay of all remote devices associated with the channel, to a demodulator that demodulates upstream transmissions;
   b. determining a propagation delay $T_1$ from a remote device experiencing the least delay of all remote devices associated with the channel, to the demodulator;
   c. defining the size of the initial maintenance region to be less than $T_2$, and at least as great as the difference between the propagation delays, $T_2-T_1$.

2. The method of claim 1, further comprising the step of:
   d. creating a MAP that expresses the starting point of the initial maintenance region.

3. The method of claim 1, further comprising the step of:
   d. sending a MAP to the at least one remote device wherein the MAP expresses the starting point of the initial maintenance region.

4. The method of claim 1, wherein step c comprises the steps of:
   i) adding, to a clock output associated with the channel, a programmable offset that is less than or equal to $T_1$, to form an offset clock output;
   ii) translating the offset clock output to a corresponding offset minislot count; and
   iii) defining the starting point of the initial maintenance region according to the offset minislot count.

5. The method of step 4, wherein the programmable offset is defined in terms of periods of a 10.24 MHz signal.

6. The method of claim 1, wherein the remote devices are cable modems.

7. The method of claim 1, wherein the headend is a cable modem termination system.

8. The method of claim 1, wherein the demodulator is incorporated in the headend.

9. The method of claim 1, wherein the demodulator is incorporated in an intermediate node.

10. A communications system in which an initial maintenance region is allocated in a communications channel for purposes of allowing synchronization between communicating entities, the system comprising:
    a headend for delivery and receipt of information;
    at least one remote device that is associated with said headend and that transmits information to said headend via an upstream channel;
    clock circuitry in said headend for generating a clock output that marks regular intervals in said upstream channel;
    an adder in said headend for adding an offset to the clock output, to offset a starting point of the initial maintenance region.

11. The system of claim 10, wherein said adder is programmable.

12. The system of claim 10, wherein said offset represents a time interval less than or equal to a propagation delay between a remote device having the shortest propagation delay of all remote devices associated with the upstream channel and said demodulator.

13. The system of claim 12, wherein said headend comprises said demodulator.

14. The system of claim 12, further comprising an intermediate node between said headend and said at least one remote device, wherein said intermediate node comprises said demodulator.

* * * * *